United States Patent
Café et al.

(10) Patent No.: US 11,506,299 B2
(45) Date of Patent: Nov. 22, 2022

(54) ROTARY VALVE

(71) Applicant: DMN Machinefabriek Noordwykerhout B.V., Noordwijkerhout (NL)

(72) Inventors: Maximiliaan Café, Noordwijkerhout (NL); Bastiaan Verbeet, Noordwijkerhout (NL); Gerhardus Johannes Maria van Liempt, Noordwijkerhout (NL); Mathijs Franz Peckelsen, Noordwijkerhout (NL)

(73) Assignee: DMN MACHINEFABRIEK NOORDWYKERHOUT B.V., Noordwijke Rhout (NL)

( * ) Notice: Subject to any disclaimer, the term of this patent is extended or adjusted under 35 U.S.C. 154(b) by 0 days.

(21) Appl. No.: 17/479,688

(22) Filed: Sep. 20, 2021

(65) Prior Publication Data
US 2022/0099208 A1 Mar. 31, 2022

(30) Foreign Application Priority Data
Sep. 25, 2020 (NL) ...................................... 2026544

(51) Int. Cl.
*F16K 27/12* (2006.01)
*F16C 23/06* (2006.01)

(52) U.S. Cl.
CPC .............. *F16K 27/12* (2013.01); *F16C 23/06* (2013.01)

(58) Field of Classification Search
CPC .. F16C 3/03; F16C 3/035; F16C 23/06; F16C 23/10; F16C 25/06; F16C 35/04;
(Continued)

(56) References Cited

U.S. PATENT DOCUMENTS

| 434,479 | A | * | 8/1890 | Simonds | ............... F16C 19/505 |
| | | | | | 384/453 |
| 1,259,751 | A | * | 3/1918 | Kuhn | ...................... F16C 25/06 |
| | | | | | 384/583 |

(Continued)

FOREIGN PATENT DOCUMENTS

| DE | 4135594 A1 | 5/1993 |
| DE | 4214467 C1 | 11/1993 |

(Continued)

*Primary Examiner* — Kenneth Rinehart
*Assistant Examiner* — Jonathan J Waddy
(74) *Attorney, Agent, or Firm* — Peacock Law P.C.; Justin Muehlmeyer

(57) ABSTRACT

A rotary valve including a housing with a removable housing cover, a rotor within the housing which is at least partially placeable outside the housing by detaching and displacing the housing cover away from the housing so as to enable access for cleaning or inspection of the rotary valve, wherein an end portion of a shaft of the rotor is mounted in a bearing assembly supported by the housing cover, which bearing assembly comprises a first bearing and a second bearing that are adjustable in position so as to maintain the shaft of the rotor in a level orientation with reference to the housing when the housing cover is moved away from the housing, wherein the first bearing and the second bearing are movable with respect to each other in a direction transversely to a longitudinal direction of the shaft.

7 Claims, 7 Drawing Sheets

Horizontal Adjustment - Outer Position (exaggerated)

(58) Field of Classification Search
CPC ...... F16C 35/042; F16C 35/06; F16C 35/061;
F16K 27/065; F16K 27/12
USPC .......................................... 251/304; 137/343
See application file for complete search history.

(56) References Cited

U.S. PATENT DOCUMENTS

| | | | | |
|---|---|---|---|---|
| 2,373,859 | A * | 4/1945 | Teaf | F16C 35/077 |
| | | | | 384/519 |
| 2,510,896 | A * | 6/1950 | Le Tourneau | F16C 25/06 |
| | | | | 384/583 |
| 2,525,744 | A * | 10/1950 | Wilshaw | F16C 23/10 |
| | | | | 425/DIG. 235 |
| 2,826,462 | A * | 3/1958 | Evans | F16C 23/06 |
| | | | | 384/519 |
| 3,130,879 | A | 4/1964 | Messing | |
| 4,622,730 | A * | 11/1986 | Steinbock | F16D 1/097 |
| | | | | 470/57 |
| 5,161,904 | A * | 11/1992 | Craft | F16C 23/06 |
| | | | | 384/583 |
| 5,212,520 | A * | 5/1993 | Toyofuku | F16C 35/061 |
| | | | | 384/219 |
| 6,186,164 | B1 | 2/2001 | Pfeifer et al. | |
| 2001/0023224 | A1* | 9/2001 | Isometsa | F16C 23/06 |
| | | | | 492/47 |
| 2009/0145683 | A1* | 6/2009 | Szczepanski | F16C 25/06 |
| | | | | 29/898.07 |
| 2011/0212800 | A1* | 9/2011 | Breunig | F16C 13/006 |
| | | | | 474/166 |
| 2012/0219244 | A1* | 8/2012 | Boeing | F16C 23/02 |
| | | | | 384/247 |
| 2014/0041957 | A1* | 2/2014 | Cymbal | B62D 5/0409 |
| | | | | 180/444 |

FOREIGN PATENT DOCUMENTS

| | | |
|---|---|---|
| EP | 3000754 A1 | 3/2016 |
| NL | 8902680 A | 5/1991 |

* cited by examiner

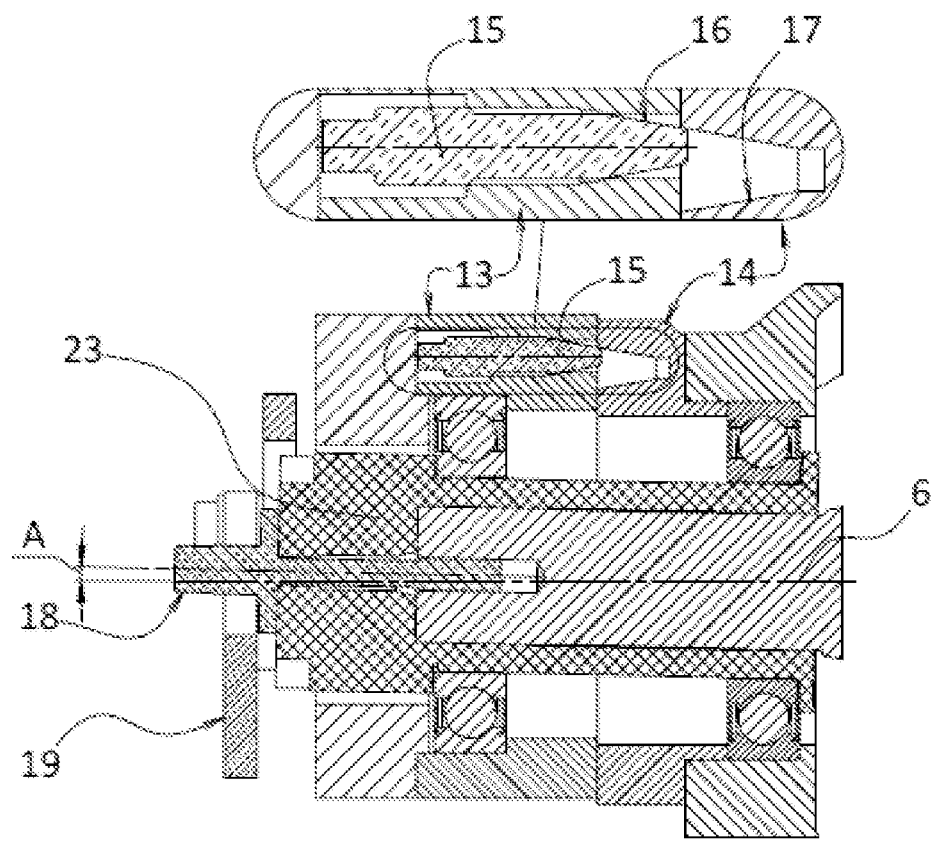
Fig. 4A – Vertical Adjustment – Upper Position (exaggerated)
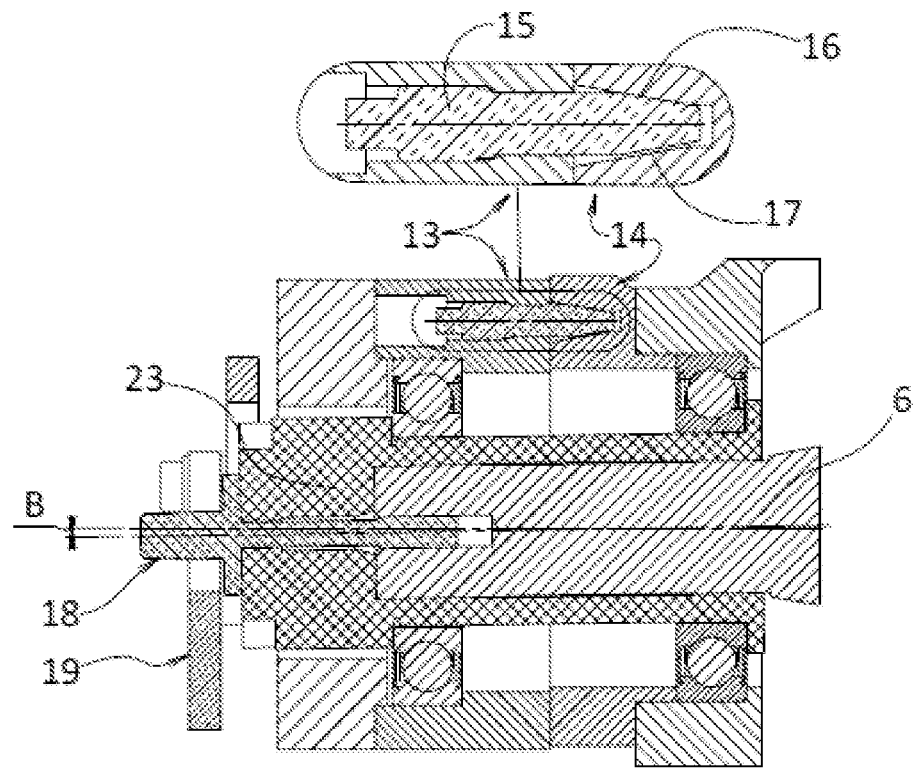
Fig. 4B – Vertical Adjustment – Lower Position (exaggerated)

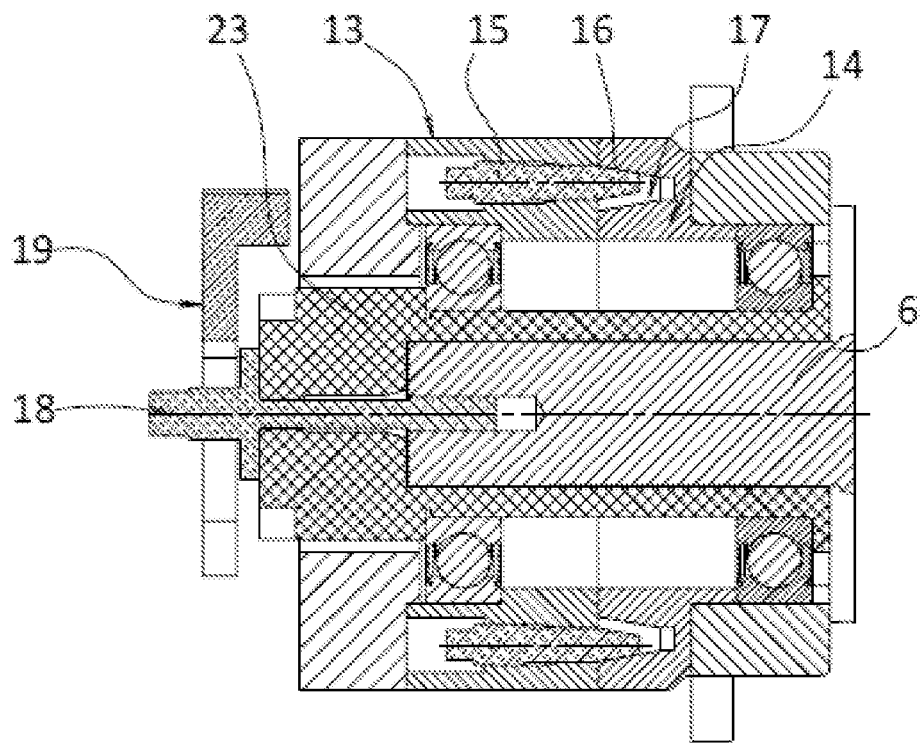
Fig. 5A – Horizontal Adjustment – Centered Position (exaggerated)
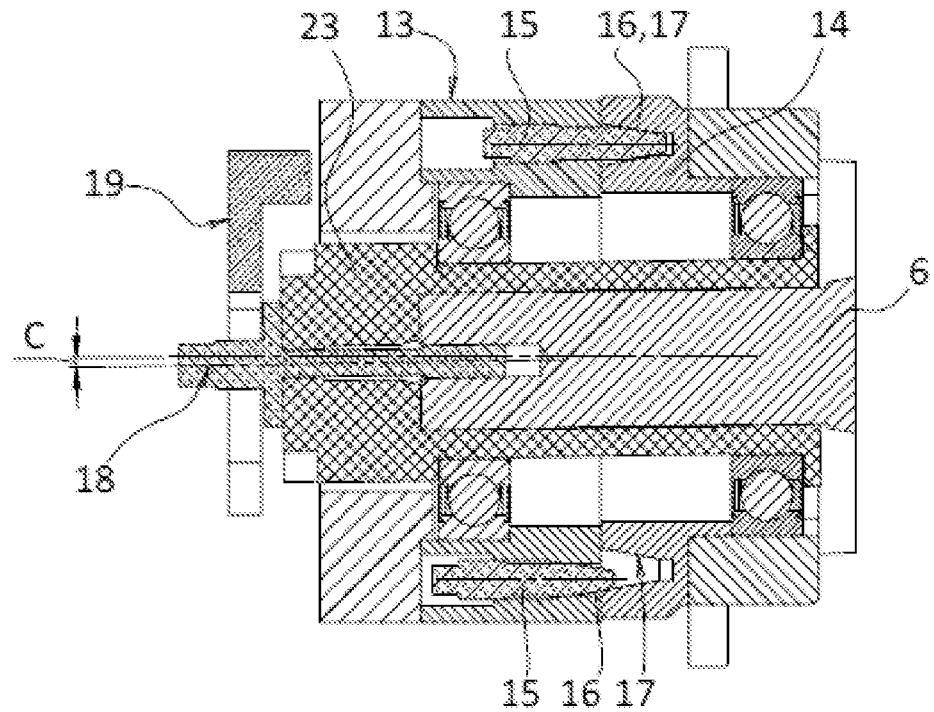
Fig. 5B – Horizontal Adjustment – Outer Position (exaggerated)

SECTION G-G

ROTARY VALVE

CROSS-REFERENCE TO RELATED APPLICATIONS

This application claims priority to and the benefit of Netherland Patent Application No. 2026544, titled "A Rotary Valve", filed on Sep. 25, 2020, and the specification and claims thereof are incorporated herein by reference.

BACKGROUND OF THE INVENTION

Field of the Invention

Embodiments of the present invention relate to a rotary valve comprising a housing with a removable housing cover, a rotor within the housing which is at least partially placeable outside the housing by detaching and displacing the housing cover away from the housing so as to enable access to an interior of the rotary valve for instance for cleaning or inspection, wherein an end portion of a shaft of the rotor is mounted in a bearing assembly supported by the housing cover, which bearing assembly comprises a first bearing and a second bearing that are adjustable in position so as to maintain the shaft of the rotor in a level orientation with reference to the housing when the housing cover is moved away from the housing.

Background Art

EP 3 000 754 describes a rotary valve in which the bearing assembly comprises a bearing housing and inner and outer bearing adjustment rings, each in threaded engagement with, and rotatable within, the bearing housing. The bearing assembly may comprise a first, inner rolling bearing, a second, outer rolling bearing and a spacing ring disposed therebetween, all located between the inner and outer bearing adjustment rings. The entirety of the bearing assembly is tiltable so as to keep the shaft of the rotor level to avoid the problem of 'drop' or 'downward pitch' of the rotor shaft when the rotor shaft is supported at a single end only. This occurs when the housing cover is detached and moved away from the housing so as to place the rotor at least partially outside the housing to enable access to the interior of the rotary valve.

A problem with the construction described in EP 3 000 754 is that it is rather complicated and its results in keeping the rotor shaft level heavily depend on the effectiveness of locking the constituent elements of the bearing assembly between the inner and outer bearing adjustment rings so as to avoid that they can move with respect to each other.

It is one of the objectives of the invention to avoid the drawbacks of the prior art, and to provide an alternative solution that does not require the application of inner and outer bearing adjustment rings.

U.S. Pat. No. 6,186,164 discloses a rotary valve wherein the first bearing and the second bearing are movable with respect to each other in a direction perpendicular to the shaft's longitudinal direction.

BRIEF SUMMARY OF THE INVENTION

A rotary valve according to the present invention is provided with the features of one or more of the appended claims.

In a first aspect of the invention, at least one of the first bearing and second bearing is mounted in an adjustment flange that is transversely movable with reference to the shaft of the rotor and which is screw connected with a base flange of the housing cover. The base flange is positionally fixed with respect to the housing cover, so that the said perpendicular movement of the adjustment flange results in relative lateral motion of the first bearing with respect to the second bearing. In this way the positioning of the first bearing and second bearing with respect to each other can be used to maintain the shaft of the rotor level when the rotor shaft is supported at a single end only. The mentioned bearings may be rolling bearings or any other suitable type of bearing.

A preferable way to realize the screw connection between the adjustment flange and the base flange, is that the screw connection comprises at least one bolt with screw thread mating with corresponding screw thread in an aperture of the adjustment flange, which at least one bolt is further provided with a tapered end portion that abuts an oblique engagement surface of an aperture in the base flange. By turning the bolt the tapered end portion cooperating with the oblique engagement surface in the aperture of the positionally fixed base flange, will cause that the adjustment flange will move in the plane of the adjustment flange with respect to the positionally fixed base flange. This in particular applies to the movement in the vertical direction, but also relates to a possible movement in the horizontal direction, as will be explained further hereinbelow.

In order to enable movement of the adjustment flange in two orthogonal directions in the plane of the adjustment flange it is preferred that the screw connection between the adjustment flange and the base flange comprises at least three bolts, each bolt having screw thread mating with corresponding screw thread in apertures of the adjustment flange, which bolts are each provided with a tapered end portion abutting oblique engagement surfaces of apertures in the base flange.

Suitably two of the at least three bolts are on opposite positions in a horizontal plane through the shaft of the rotor so as to provide for horizontal adjustment of the shaft, whereas the third bolt is in a vertical plane through the shaft of the rotor and above the shaft so as to provide for vertical adjustment of the shaft. For movement in this vertical plane there is no need for a fourth bolt on an opposite side of the said third bolt, because gravity assists in any desired movement in an opposite direction than what can be enacted with the third bolt. It is however possible to apply also such a fourth bolt opposite to the third bolt for movements in the vertical plane.

In another aspect of the invention which can be applied independent from the features discussed above or in addition thereto, it is preferable that an end portion of the rotary valve is provided with a center bolt and a lock plate, which lock plate is placeable in an operative position wherein the lock plate provides support for the center bolt to enable longitudinal movement of the shaft with the rotor by turning of the center bolt.

It is further preferred that in a nonoperative position the lock plate is below the center bolt to avoid unintentional damage to the screw thread of the center bolt. In this way gravity will assist in keeping the lock plate in the nonoperative position, so that it will require a purposeful handling by an operator to place the lock plate in an operative position.

Preferably the lock plate is provided with a lock plate handle to move the swivable lock plate between the nonoperative position and the operative position.

It is further desirable that the lock plate is provided with at least one protrusion for engaging one or more notches on the shaft hub of the rotor shaft. In this manner rotation of the rotor can be blocked by placing the protrusion in one of the notches in the shaft hub.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIGS. 4A and 4B show the end portion of the rotary valve according to an embodiment of the present invention in a vertical section representing two different positions of the first bearing and the second bearing;

FIGS. 5A and 5B show the end portion of the rotary valve according to an embodiment of the present invention in a horizontal section representing two different positions of the first bearing and the second bearing;

DETAILED DESCRIPTION OF THE INVENTION

Figure 1:
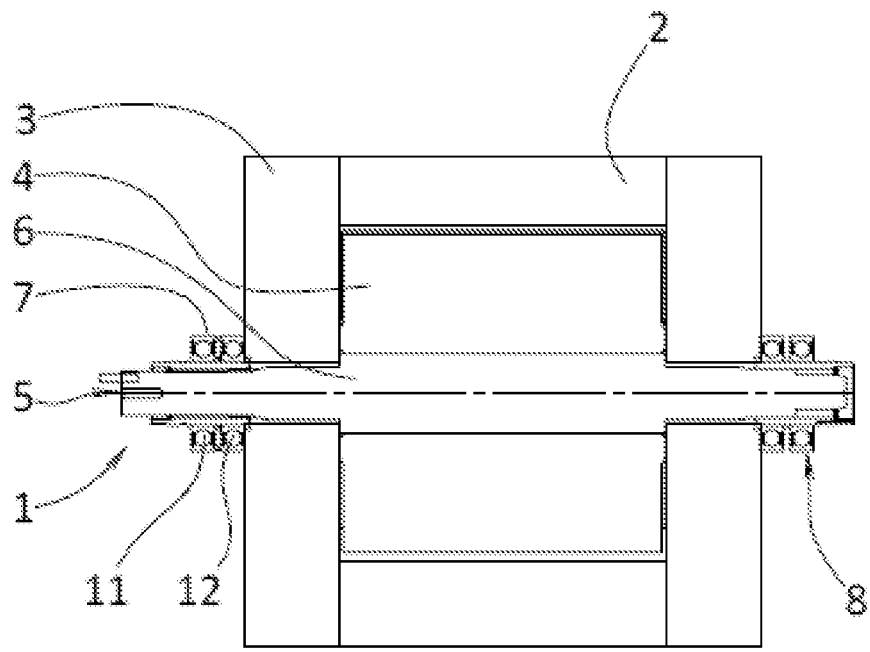
FIGS. 1 and 2 are schematic illustrations of a rotary valve in an operative position and in a nonoperative position, respectively, according to an embodiment of the present invention.

Whenever in the figures the same reference numerals are applied, these numerals refer to the same parts.

Figure 2:
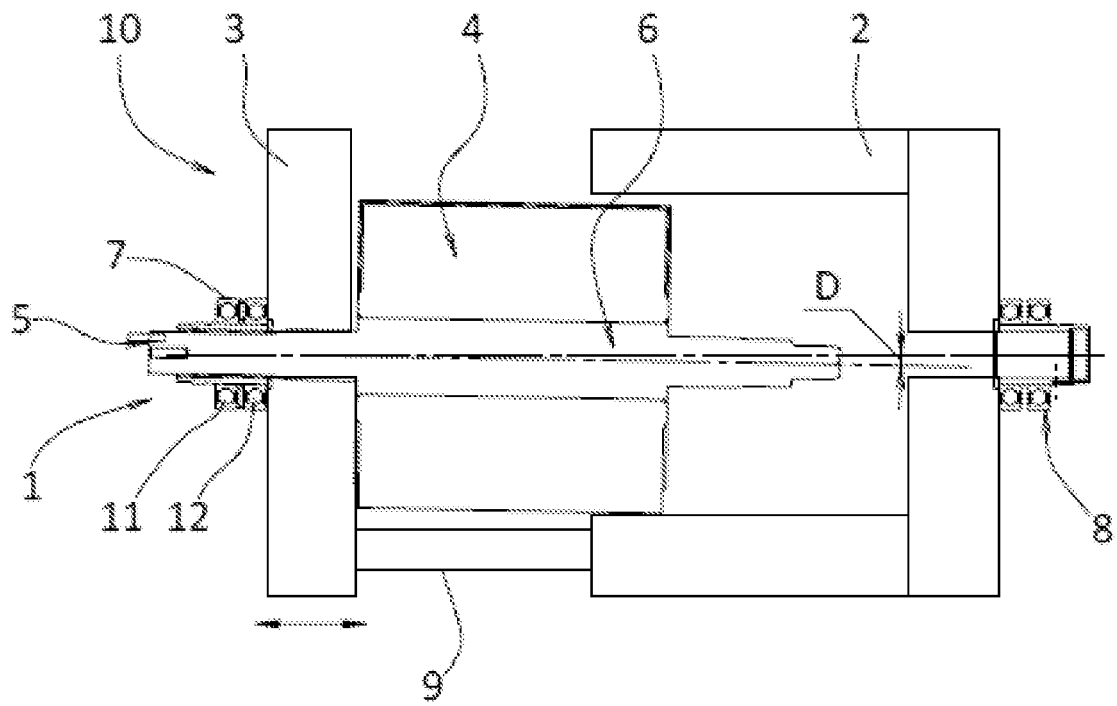

With reference first to FIGS. 1 and 2, a rotary valve 1 is shown, comprising housing 2 with removable housing cover 3 (as shown in FIG. 2), rotor 4 within housing 2 which is at least partially placeable outside housing 2 by detaching and displacing housing cover 3 away from housing 2 so as to enable access to the interior of rotary valve 1, for instance for cleaning or inspection. FIGS. 1 and 2 show further that end portion 5 of shaft 6 of rotor 4 is mounted in bearing assembly 7 supported by housing cover 3.

When according to FIG. 1 the rotor 4 is completely inside housing 2 with housing cover 3 mounted on housing 2, shaft 6 of rotor 4 is also placed—usually via a sleeve—in bearing 8 on the side of housing 2 opposite to where the dismountable and displaceable housing cover 3 is positioned.

In FIG. 2 it is depicted that rotor 4 is partly placed outside of housing 2. This can be done after first detaching housing cover 3 from housing 2, and by subsequently moving, for instance by sliding, end portion 10 comprising bearing assembly 7 and housing cover 3 away from housing 2 using for instance a construction with guide rails 9. This construction is however not essential, moving end portion 10 away from housing 2 can also be implemented differently.

At the time shaft 6 of rotor 4 is only supported by bearing 7 which is supported by housing cover 3, rotor shaft 6 has the tendency to drop or turndown a little distance D as depicted in FIG. 2. According to the invention, the problem of dropping or pitching down of rotor 4 is countered with features as further elucidated with reference to the following description and drawings.

Figure 3:
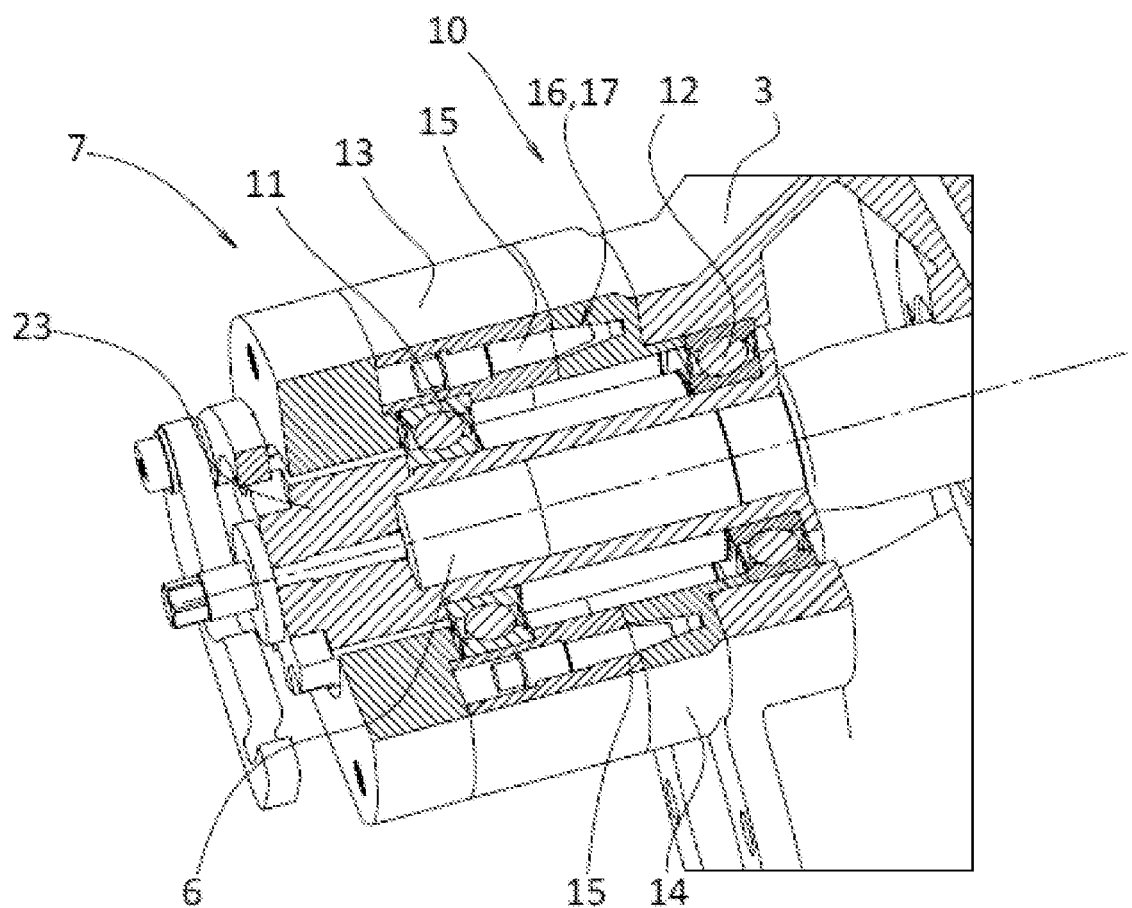
FIG. 3 shows an end portion of a rotary valve according to an embodiment of the present invention in an isometric and partly cut open view.

FIG. 3 provides a detailed view at end portion 10 of rotary valve 1. FIG. 3 shows that bearing assembly 7 comprises first bearing 11 and second bearing 12. First and second bearings 11, 12 are adjustable in position so as to maintain shaft 6 of the rotor in a level orientation with reference to housing 2 when—as shown in FIG. 2—housing cover 3 is detached and moved away from housing 2. This adjustability of the bearings is provided by the feature that at least one of first bearing 11 and second bearing 12 is movable in a direction perpendicular to the longitudinal direction of shaft 6. Essentially this means that first bearing 11 and second bearing 12 are movable with respect to each other in a direction perpendicular to the shaft's longitudinal direction. One thing and another can more clearly be seen in FIGS. 4A and 4B and 5A and 5B.

All of the said FIGS. 3, 4A, 4B, 5A and 5B show a preferred embodiment wherein first bearing 11 is mounted in adjustment flange 13 that is transversely movable with reference to shaft 6 of rotor 4 and which is screw connected with a positionally fixed base flange 14 of housing cover 3. In principle this could also be done vice versa.

It is shown in the respective figures that the screw connection between adjustment flange 13 and base flange 14 comprises at least one bolt 15 that is provided with screw thread mating with corresponding screw thread in an aperture of adjustment flange 13—these screw threads are not shown since the way they can be implemented is clearly within the scope of the skilled person. The at least one bolt 15 is further provided with tapered end portion 16 that abuts oblique engagement surface 17 of aperture in positionally fixed base flange 14. For the purpose of clarity the angle of the surface 17 which provides the oblique positioning of this surface 17 is shown out of scale. It is further remarked that it is also possible to apply a mirror image construction with two bolts 15 with tapered end portions 16, which cooperating bolts 15 and apertures 17 are then on opposite sides of shaft 6 of rotor 4. Such a construction will hereinafter be discussed for movement in the horizontal plane with reference to FIGS. 5A and 5B.

The difference between what is shown in FIGS. 4A and 4B and FIGS. 5A and 5B will now be discussed.

FIGS. 4A and 4B provide a view at a vertical section representing two different vertical positions of first bearing 11 and second bearing 12 with respect to each other.

In FIG. 4A, bolt 15 is at the entrance of the aperture in base flange 14 with oblique surface 17, causing that first bearing 11 is at a slightly higher position than second bearing 12.

In FIG. 4B, bolt 15 is screwed into the aperture in base flange 14 with oblique surface 17, causing that first bearing 11 is at a slightly lower position than second bearing 12.

The combination of FIGS. 4A and 4B thus demonstrates that by displacing bolt 15 into or out of the aperture in base flange 14, the relative vertical position of first bearing 11 and second bearing 12 can be adjusted, and accordingly shaft 6 of rotor 4 can be maintained level. It is already remarked above that the adjustment of first bearing 11 and second bearing 12 with respect to each other can also be implemented with a mirror image construction with two bolts 15 with tapered end portions 16, wherein bolts 15 and apertures 17 are on opposite sides of shaft 6 of rotor 4.

FIGS. 5A and 5B show the construction as explained with reference to FIGS. 4A and 4B, but now for moving the respective bearings 11, 12 in a horizontal plane. FIGS. 5A and 5B provide a view at a horizontal section representing two different horizontal positions of first bearing 11 and second bearing 12 with respect to each other. A further discussion of FIGS. 5A and 5B concerning the operation of the construction would be similar as the above discussion with reference to FIGS. 4A and 4B and is for sake of brevity therefore dispensed with.

The combination of FIGS. 4A, 4B and 5A and 5B together depict the for its simplicity preferred embodiment wherein the screw connection between adjustment flange 13 and base flange 14 comprises at least three bolts 15, each bolt 15 having a screw thread mating with corresponding screw threads in apertures of adjustment flange 13, and which bolts 15 are each provided with tapered end portion 16 abutting oblique engagement surfaces 17 of apertures in base flange 14.

FIGS. 5A and 5B show that two of the at least three bolts 15 are on opposite positions in a horizontal plane through the shaft 6 of the rotor 4 so as to provide for horizontal adjustment of the shaft 6, whereas FIGS. 4A and 4B show that remaining third bolt 15 is in a vertical plane through shaft 6 of rotor 4 and above shaft 6 so as to provide for vertical adjustment of shaft 6. It is again repeated that it is also possible to apply for vertical motion a mirror image construction with two bolts 15 with tapered end portions 16 on opposite sides of shaft 6 of rotor 4.

Turning now to FIGS. 6A, 6B, 7A, 7B, 8A, and 8B it is shown that an end portion of rotary valve 1 is provided with center bolt 18 and lock plate 19, which lock plate 19 is placeable in an operative position (as shown in FIGS. 7A, 7B and 8A, 8B) wherein lock plate 19 provides support for center bolt 18 to enable longitudinal movement of shaft 6 with rotor 4 by turning of center bolt 18.

Figure 6B:
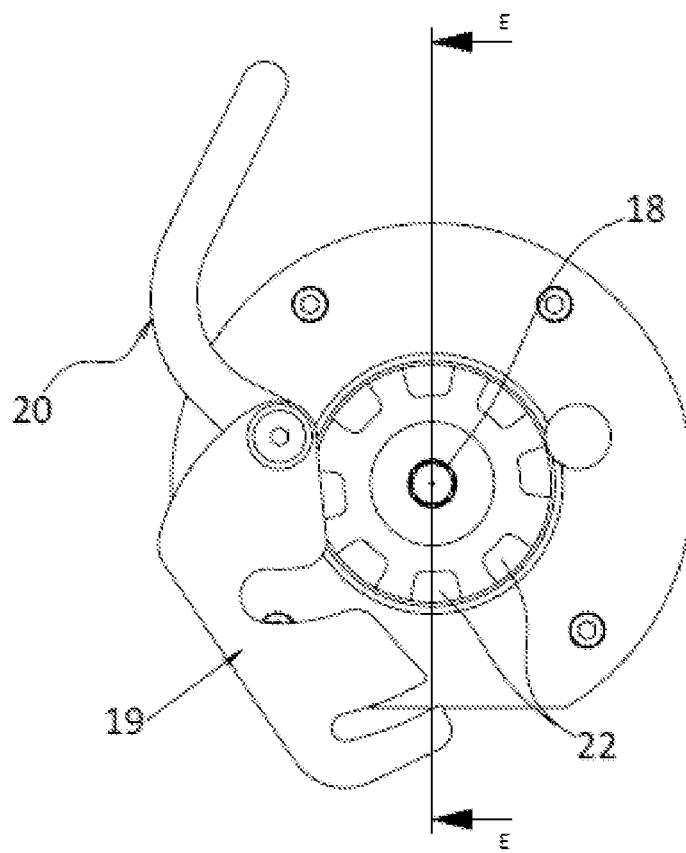
FIGS. 6A, 6B, 7A, 7B, 8A and 8B show cross-sectional side views and frontal views of an end portion of the shaft on the side of the detachable house cover according to an embodiment of the present invention.
Figure 6A:
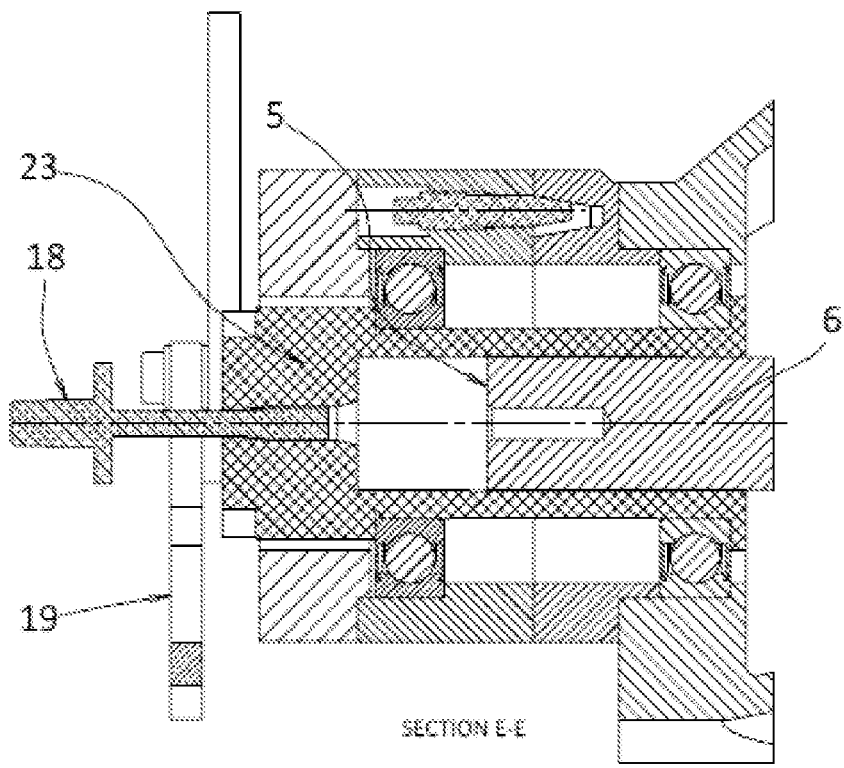

FIGS. 6A and 6B depict that in a nonoperative position lock plate 19 is below center bolt 18 in order to prevent accidental damage of the screw thread of center bolt 18, which would be possible when the rotor is placed with a high-speed in shaft hub 23.

It is further shown that lock plate 19 is provided with lock plate handle 20 to move the lock plate 19 between the nonoperative position of FIGS. 6A/6B and the operative position of FIGS. 7A and 7B and 8A and 8B.

Figure 7B:
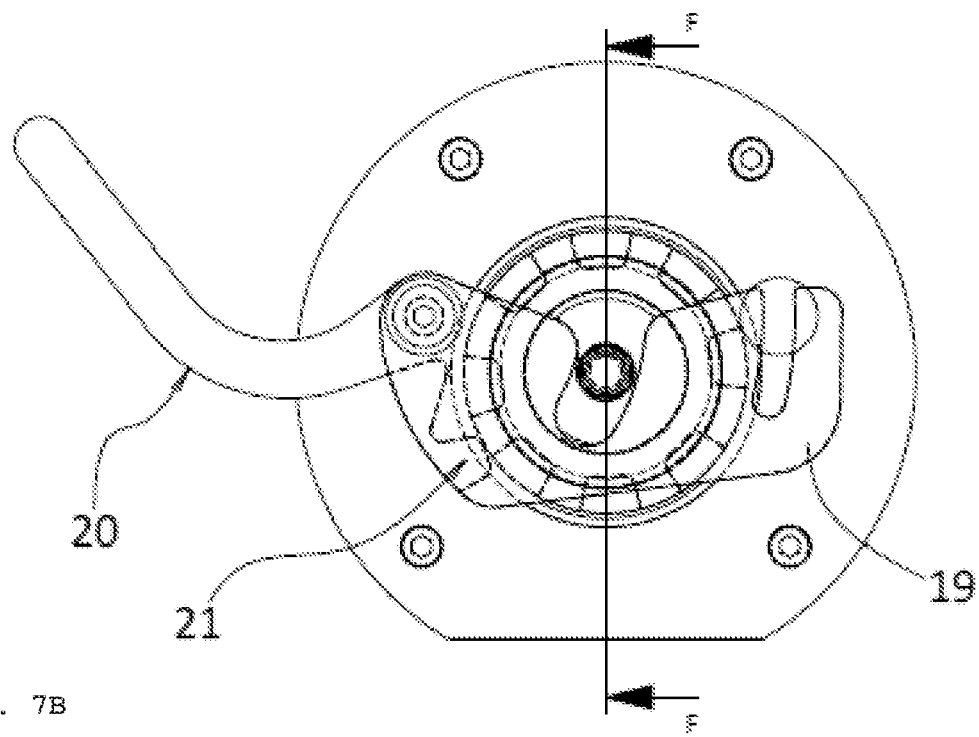
Figure 7A:
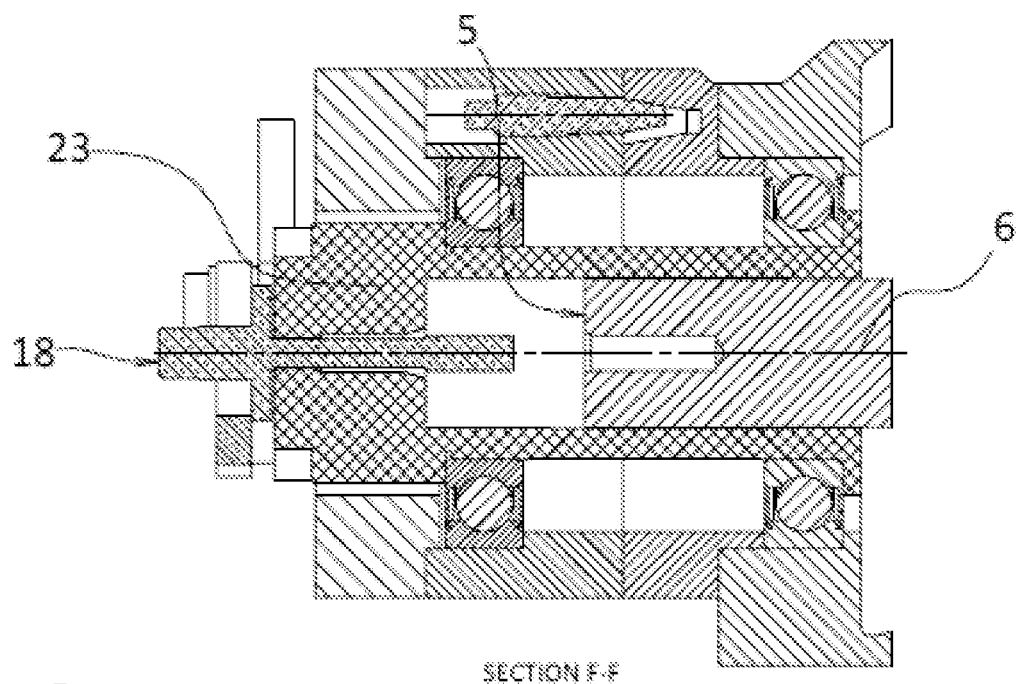
Figure 8B:
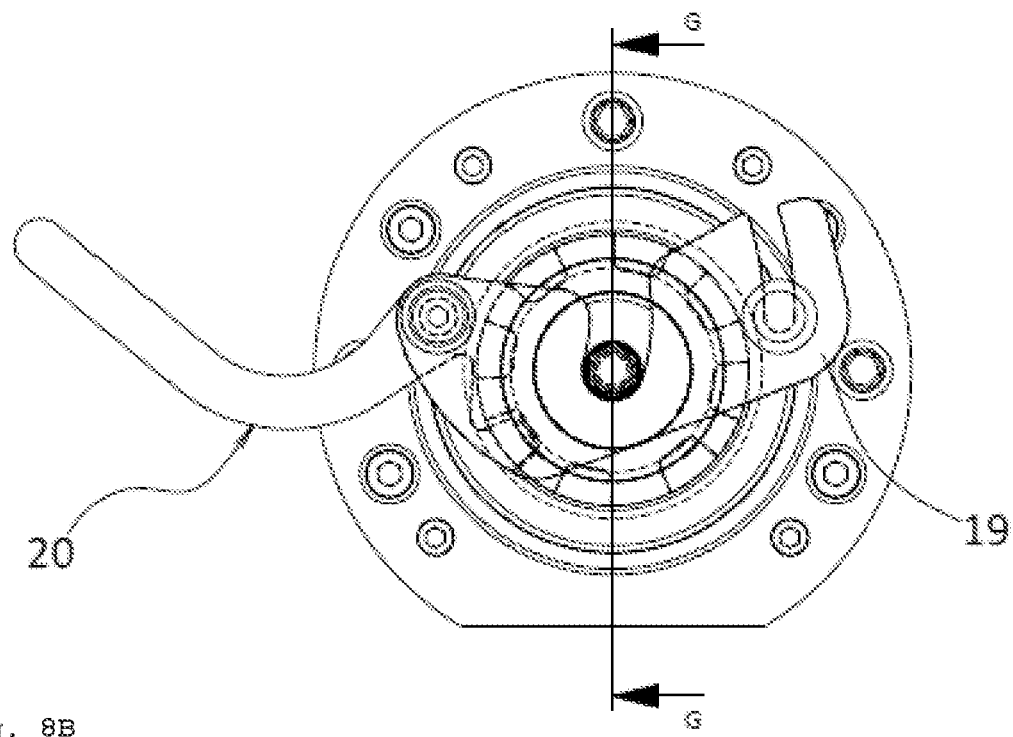
Figure 8A:
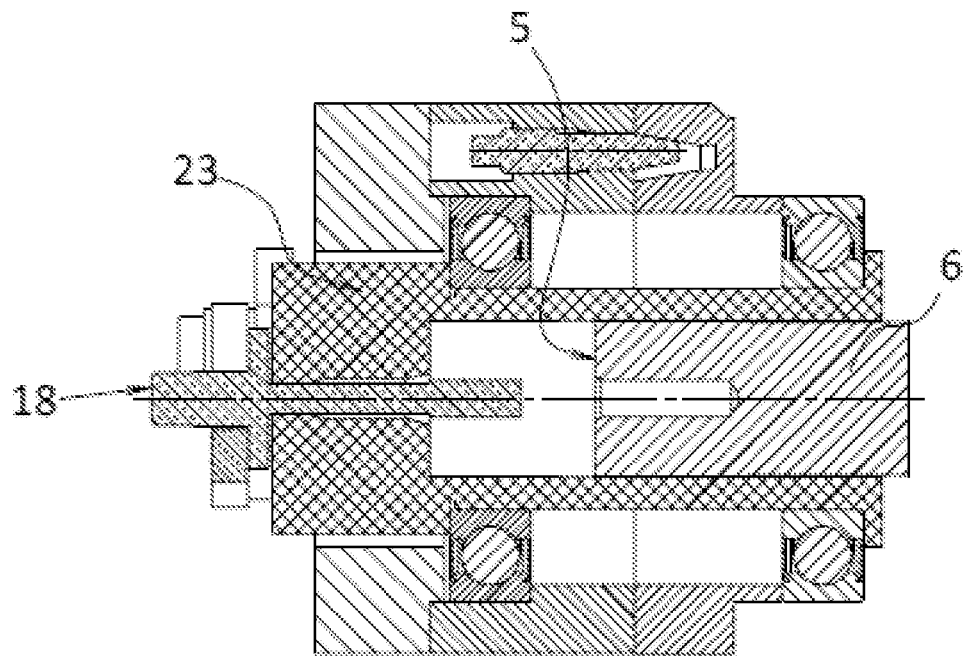

FIGS. 7A and 7B and FIGS. 8A and 8B show in that connection that lock plate 19 is provided with at least one protrusion 21 for engaging one or more notches 22 on shaft hub 23 housing shaft 6 of rotor 4. In FIGS. 7A and 7B, lock plate 19 has not been positioned to block rotation of rotor 4 since rotation of the rotor is then blocked by the motor connected to rotor 4. In FIGS. 8A and 8B, rotor 4 is disconnected from the motor and one of protrusions 21 has engaged notch 22 on shaft hub 23 of shaft 6 of rotor 4 to block rotation of rotor 4.

Although the invention has been discussed in the foregoing with reference to an exemplary embodiment of the rotary valve of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A rotary valve comprising:
a housing with a removable housing cover;
a rotor within the housing which is at least partially placeable outside the housing by detaching and displacing the housing cover away from the housing so as to enable access to an interior of the rotary valve, wherein an end portion of a shaft of the rotor is mounted in a bearing assembly supported by the housing cover, which bearing assembly comprises a first bearing and a second bearing that are adjustable in position so as to maintain the shaft of the rotor in a level orientation with reference to the housing when the housing cover is moved away from the housing, and wherein the first bearing and the second bearing are movable with respect to each other in a direction transversely to a longitudinal direction of the shaft, wherein at least one of the first bearing and second bearing is mounted in an adjustment flange that is transversely movable with reference to the shaft of the rotor and which is screw connected with a base flange of the housing cover; and
a center bolt and a lock plate disposed on an end portion of the rotary valve, which lock plate is placeable in an operative position wherein the lock plate provides support for the center bolt to enable longitudinal movement of the shaft with the rotor by turning of the center bolt.

2. The rotary valve of claim 1, wherein the screw connection between the adjustment flange and the base flange comprises at least one bolt comprising screw thread that is mating with corresponding screw thread in an aperture of the adjustment flange, which at least one bolt is provided with a tapered end portion that abuts an oblique engagement surface of an aperture in the base flange.

3. The rotary valve of claim 1, wherein the screw connection between the adjustment flange and the base flange comprises at least three bolts, each bolt comprising screw thread mating with corresponding screw thread in apertures of the adjustment flange, which bolts are each provided with a tapered end portion abutting oblique engagement surfaces of apertures in the base flange.

4. The rotary valve of claim 3, wherein two of the at least three bolts are on opposite positions in a horizontal plane through the shaft of the rotor so as to provide for horizontal adjustment of the shaft, whereas the third bolt is in a vertical plane through the shaft of the rotor and above the shaft so as to provide for vertical adjustment of the shaft.

5. The rotary valve of claim 1, wherein in a nonoperative position the lock plate is below the center bolt.

6. The rotary valve of claim 5, wherein the lock plate comprises a lock plate handle to move the lock plate between the nonoperative position and the operative position.

7. The rotary valve of claim 6, wherein the lock plate comprises at least one protrusion for engaging one or more notches on a shaft hub which houses the shaft of the rotor.

\* \* \* \* \*